(12) United States Patent
Iemura

(10) Patent No.: US 7,864,401 B2
(45) Date of Patent: Jan. 4, 2011

(54) OPTICAL PHASE SHIFTING PLATE

(75) Inventor: Koki Iemura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 45 days.

(21) Appl. No.: 12/481,039

(22) Filed: Jun. 9, 2009

(65) Prior Publication Data

US 2009/0303568 A1  Dec. 10, 2009

(30) Foreign Application Priority Data

Jun. 10, 2008   (JP) ............................. 2008-152238

(51) Int. Cl.
*G02F 1/01* (2006.01)
(52) U.S. Cl. ..................................... 359/288
(58) Field of Classification Search ................ 359/288, 359/238; 385/2
See application file for complete search history.

(56) References Cited

U.S. PATENT DOCUMENTS

2007/0140695 A1   6/2007  Suzuki et al.
2010/0046879 A1*  2/2010  Lee et al. ....................... 385/2

FOREIGN PATENT DOCUMENTS

| EP | 1 659 445 A1 | 5/2000 |
| JP | 2007-151026 A | 6/2007 |
| WO | 03/005091 A2 | 1/2003 |

OTHER PUBLICATIONS

Extended European Search Report issued in European Patent Application No. 09162016.1-2205 dated Oct. 22, 2009.

* cited by examiner

*Primary Examiner*—Timothy J Thompson
(74) *Attorney, Agent, or Firm*—Sughrue Mion, PLLC

(57) ABSTRACT

An optical phase shifting plate includes: an optical substrate configured to change a refractive index for light which passes through the optical substrate by a thermooptical effect; a thin-film heater formed on a surface of the optical substrate; a wiring member disposed to be substantially perpendicular to the surface of the optical substrate; an intermediate member disposed between the optical substrate and the wiring member, the intermediate member having: a first surface that is substantially flush with a surface of the thin-film heater; and a second surface that is substantially flush with a surface of the wiring member and that is perpendicularly adjacent to the first surface, a first bonding wire which electrically connects the surface of the thin-film heater to the first surface of the intermediate member; and a second bonding wire which electrically connects the surface of wiring member to the second surface of the intermediate member.

9 Claims, 4 Drawing Sheets

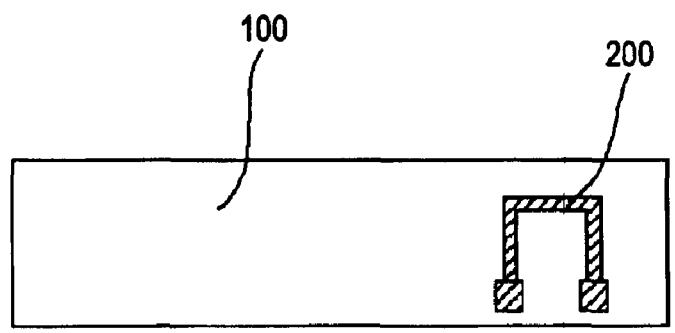
FIG. 3A
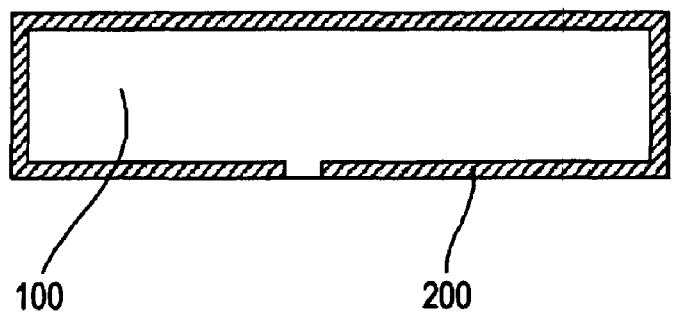
FIG. 3B
FIG. 4
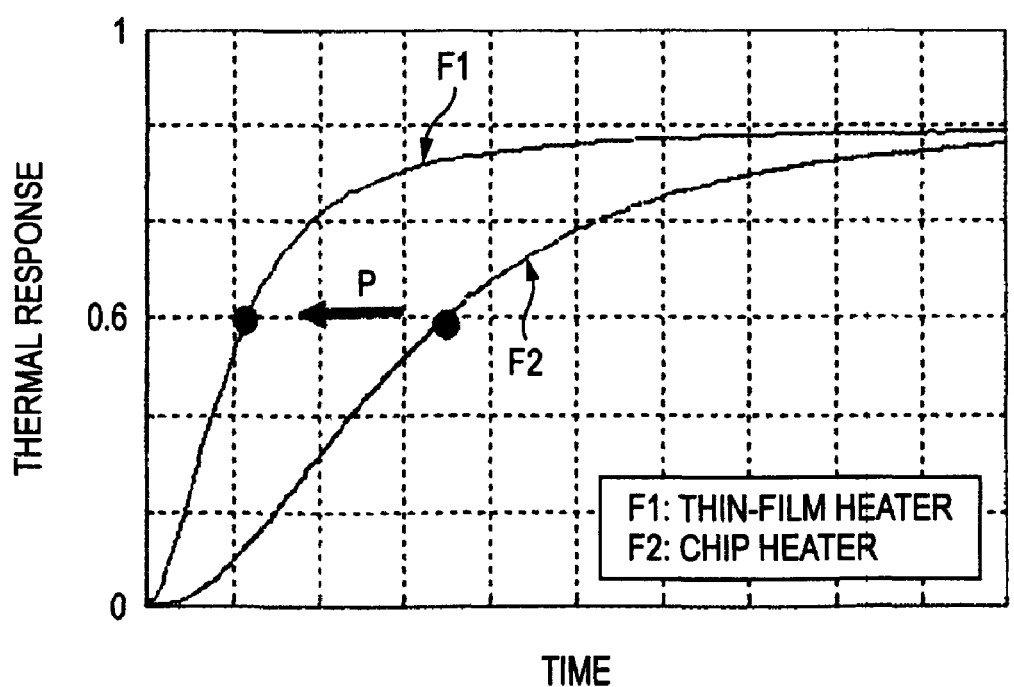

L: TRANSMITTED LIGHT

OPTICAL PHASE SHIFTING PLATE

This application claims priority from Japanese Patent Application No. 2008-152238, filed on Jun. 10, 2008, the entire contents of which are incorporated by reference herein.

BACKGROUND OF THE INVENTION

1. Technical Field

The present disclosure relates to an optical phase shifting plate, and more particularly, to an optical phase shifting plate in which a heater is bonded to an optical substrate that can change the refractive index for transmitted light by the thermooptical effect and which adjusts the optical path length of the transmitted light by a thermal response of the optical substrate.

2. Related Art

An optical phase shifting plate is configured to finely adjust the optical path length in a space optical system, and used as phase shifting means for a Michelson interferometer, a Mach-Zehnder interferometer, or the like. A demodulator including a Michelson interferometer or a Mach-Zehnder interferometer is disclosed in JP-A-2007-151026, for example.

FIG. 5 is a functional block diagram describing the operation of an optical phase shifting plate used for a Michelson interferometer. The Michelson interferometer 500 includes a beam splitter 501 and planar mirrors 502, 503.

The beam splitter 501 is a planar member in which a dielectric multilayer film 501b is formed on a glass substrate 501a. The beam splitter 501 reflects an incident light beam L500 which enters at a certain angle (for example, 45°), and allows the incident light beam L500 to transmit therethrough to split the light beam L500 into split light beams L501, L502 having a certain intensity ratio (1:1).

The beam splitter 501 multiplexes the split light beams L501, L502 which are reflected respectively from the planar mirrors 502, 503 such that the split light beams L501, L502 interfere with each other, and then splits the interference light beam which is obtained as a result of the interference, at a certain intensity ratio (1:1).

According to the configuration, the planar mirrors 502, 503 are positioned so that the optical path length of the split light beam L501 is longer by a predetermined length than that of the split light beam L502. Thus, the split light beam L501 is delayed by a predetermined time from the split light beam L502.

Thereafter, the split light beams are multiplexed by the beam splitter 501 to interfere with each other, whereby the phases of the split light beam L502 and the split light beam L501, which is delayed by the predetermined time, are compared with each other. Interference light beams having an intensity which corresponds to a result of the phase comparison are output as output light beams L503, L504.

An optical phase shifting plate is provided between the beam splitter 501 and the planar mirror 502 to compensate time delay caused by temperature variation, and finely adjusts the optical path length of the split light beam L501 (i.e., the delay time) thereby performing the phase adjustment of the optical path of the space optical system.

Also, the optical phase shifting plate includes: an optical substrate 1 made of silicon which can change the refractive index by means of the thermooptical effect; and a chip heater 2 bonded onto the optical substrate 1. The chip heater 2 is heated by a control current I supplied from phase adjusting means 3, and the optical path length of the split light beam L501 which passes through the optical substrate 1 is adjusted by the thermal response of the optical substrate 1.

FIG. 6 is a perspective view showing an optical phase shifting plate using the chip heater according to the related art. The chip heater 2 is commercially available as a chip component, and is adhesively fixed to the optical substrate 1 in a certain region that is away from a region through which light beam passes.

FIG. 7 is a side view showing an optical system using the optical phase shifting plate according to the related art. The optical substrate 1 is attached to an attaching portion 4a provided at the bottom portion of a package 4. Optical components 5, 6 such as a beam splitter and a planar mirror are provided on the package 4 with the optical substrate 1 interposed therebetween. The optical substrate 1 is placed in the middle of an optical path L between the optical components so as to be perpendicular to the optical path.

The chip heater 2 is bonded to the optical substrate 1, and connected to a current input terminal 8 which is provided at a side portion 4b of the package 4, through a wire such as a thin copper wire. The wire is provided in a hollow portion of the package 4, and the heating current I is supplied to the chip heater 2 through the wire.

The structure of the related art optical phase shifting plate has the following problems.

(1) An electric power must be supplied to the chip heater through the wiring such as a thin copper wire which is passed through the air. In order to perform the wiring connection without interrupting the light beam path, a space for the wiring must be ensured in the package, and a wire fixing mechanism for preventing the wiring from vibrating (e.g., a projection) is required to for ensure the reliability. However, such a structure causes the problems that the package structure becomes complicated and the production cost is increased.

(2) When the chip heater is used, the optical substrate needs to be enlarged in accordance with the volume for disposing the heater. Moreover, the thermal capacity is increased as the volume of the chip heater is increased. Thus, the responsibility of the phase shift is deteriorated, and also the power consumption is increased.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the invention to provide an optical phase shifting plate which can realize high responsibility and low power consumption and which includes a power supply path that can simplify the package structure.

According to one or more aspects of the present invention, an optical phase shifting plate is provided. The optical phase shifting plate comprises: an optical substrate configured to change a refractive index for light which passes through the optical substrate by means of a thermooptical effect; a thin-film heater formed on a surface of the optical substrate; a wiring member disposed to be substantially perpendicular to the surface of the optical substrate; an intermediate member disposed between the optical substrate and the wiring member, the intermediate member comprising: a first surface that is substantially flush with a surface of the thin-film heater; and a second surface that is substantially flush with a surface of the wiring member and that is perpendicularly adjacent to the first surface, a first bonding wire which electrically connects the surface of the thin-film heater to the first surface of the intermediate member; and a second bonding wire which electrically connects the surface of wiring member to the second surface of the intermediate member.

According to one or more aspects of the present invention, the first and second surfaces are plated, and the intermediate member is a rectangular parallelepiped.

According to one or more aspects of the present invention, an antireflection film is formed on incident and outgoing surfaces of the optical substrate.

According to one or more aspects of the present invention, the optical phase shifting plate further comprises: a package which is made of a Kovar material and to which the wirings member and the intermediate member are fixed.

According to one or more aspects of the present invention, the wiring member is made of an alumina material and the surface of the wiring member is gold plated.

According to one or more aspects of the present invention, the first and second surfaces are gold plated.

According to one or more aspects of the present invention, the thin-film heater is formed to surround a portion of the surface of the optical substrate that is away from light incident and outgoing surfaces of the optical substrate.

According to one or more aspects of the present invention, the thin-film heater is formed to surround a peripheral edge portion of the surface of the optical substrate.

According to one or more aspects of the present invention, the optical phase shifting plate is used for a Michelson interferometer or a Mach-Zehnder interferometer.

Other aspects and advantages of the present invention will be apparent from the following description, the drawings, and the claims.

BRIEF DESCRIPTION OF THE DRAWINGS

FIGS. 3A and 3B are plan views showing the configuration of a thin-film heater formed on an optical substrate;

FIG. 4 is a graph describing temperature response characteristics of the exemplary embodiment as compared with the configuration of the related art;

DETAILED DESCRIPTION OF EXEMPLARY EMBODIMENTS OF THE INVENTION

Exemplary embodiments of the invention will be now described with reference to the drawings.

Figure 1:
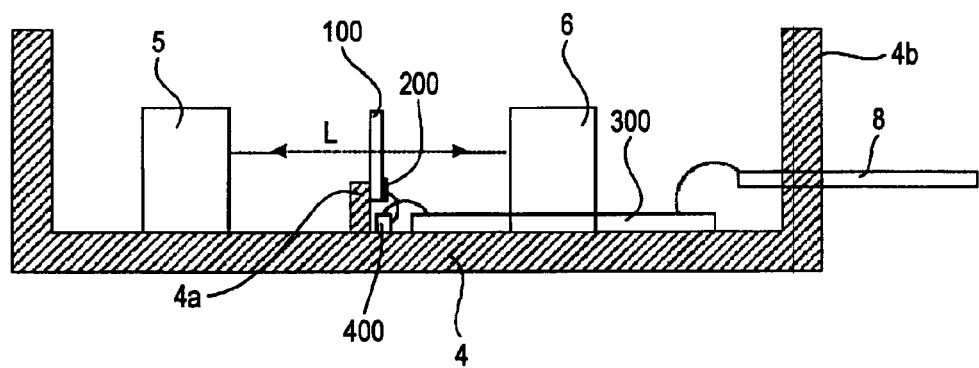
FIG. 1 is a side view showing an optical system using an optical phase shifting plate according to an exemplary embodiment of the invention.
Figure 7:
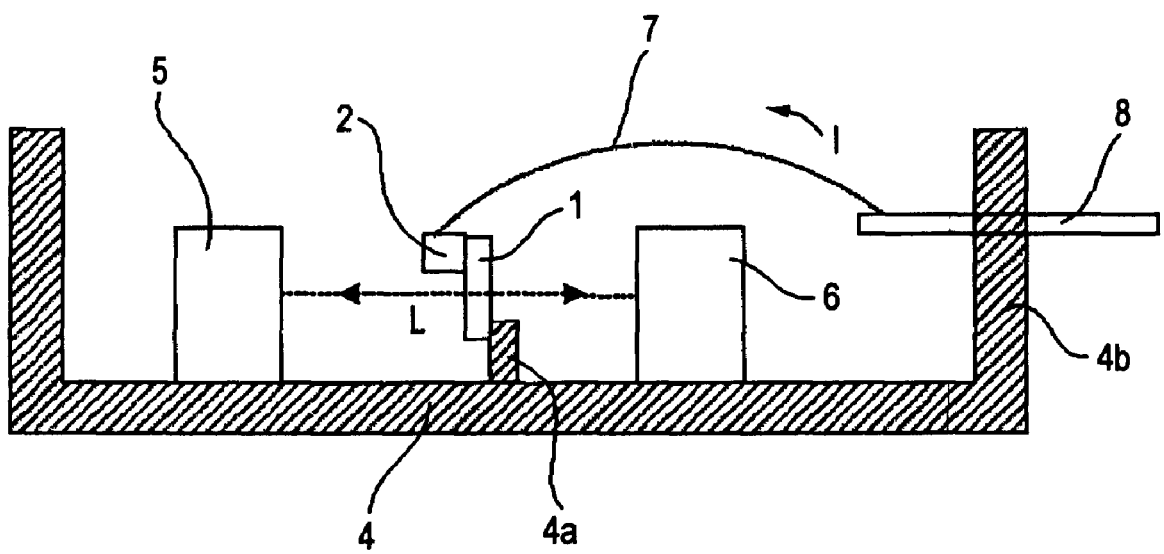
FIG. 7 is a side view showing an optical system using the optical phase shifting plate according to the related art.

FIG. 1 is a side view showing an optical system using an optical phase shifting plate according to an exemplary embodiment of the invention. The same components as those described with reference to FIG. 7 are denoted by the identical reference numerals, and the descriptions are omitted hereinafter.

In FIG. 1, an optical substrate 100 is attached to the attaching portion 4a provided at the bottom portion of the package 4. The optical components 5, 6 such as a beam splitter and a planar mirror are provided on the package 4 with the optical substrate 100 interposed therebetween. The optical substrate 100 is placed in the middle of the optical path L between the optical components so as to be perpendicular to the optical path.

A thin-film heater 200 is formed on the optical substrate 100 by vapor deposition or a semiconductor process, and is connected to the current input terminal 8 which is provided at the side portion 4b of the package 4, through a wiring member 300 and an intermediate member 400, and thus the heating current I is supplied to the heater. The wiring member 300 is fixed on the bottom portion of the package 4 so as to be substantially perpendicular to the surface of the optical substrate 100.

In order to shift the incidence positions of transmitted and reflected light beams from each other, the surface of the optical substrate 100 is placed so as to be inclined by several degrees (about 3 degrees) from 90 degrees with respect to the horizontal plane. Therefore, the surface of the optical substrate 100 is not strictly perpendicular to the wiring member 300 which is horizontally fixed on the bottom portion of the package 4. However, in view of a wire bonding process, they can be deemed to be substantially in a perpendicular relationship.

The optical substrate 100 has a function of shifting the optical phase. The optical substrate 100 is made of a material (e.g., silicon) in which the refractive index is changed in response to the temperature. Also, an antireflection film formed of $Ta_2O_5$ or the like is applied to the light incident and outgoing surfaces. As the thin-film heater 200, NiCr, Pt, or the like which can function as a resistor may be used.

Figure 2:
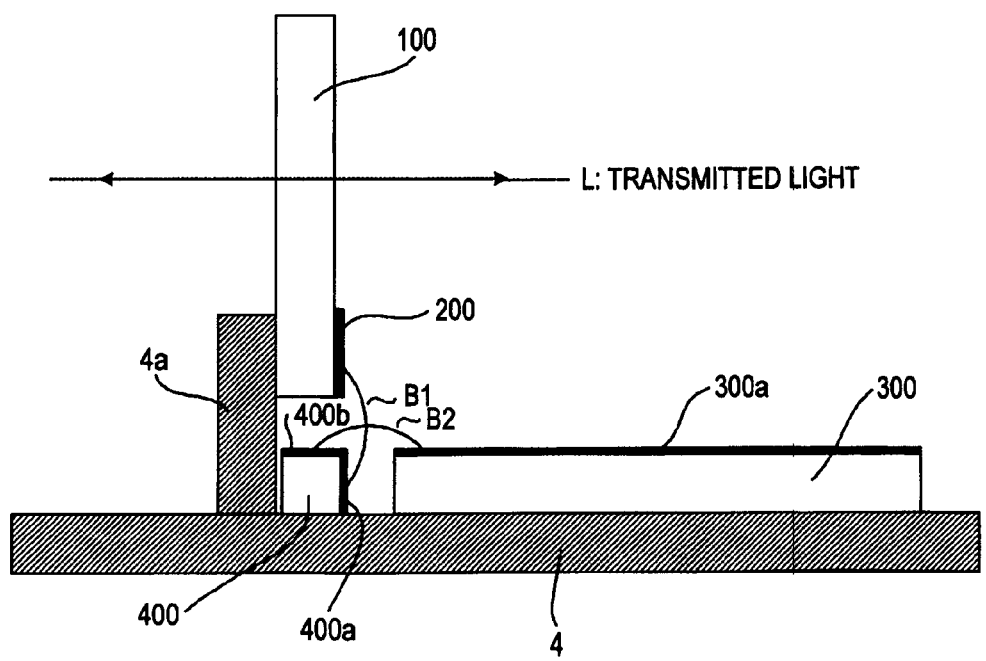
FIG. 2 is an enlarged side view showing the configuration of main portions of the optical phase shifting plate according to the exemplary embodiment of the invention.
Figure 5:
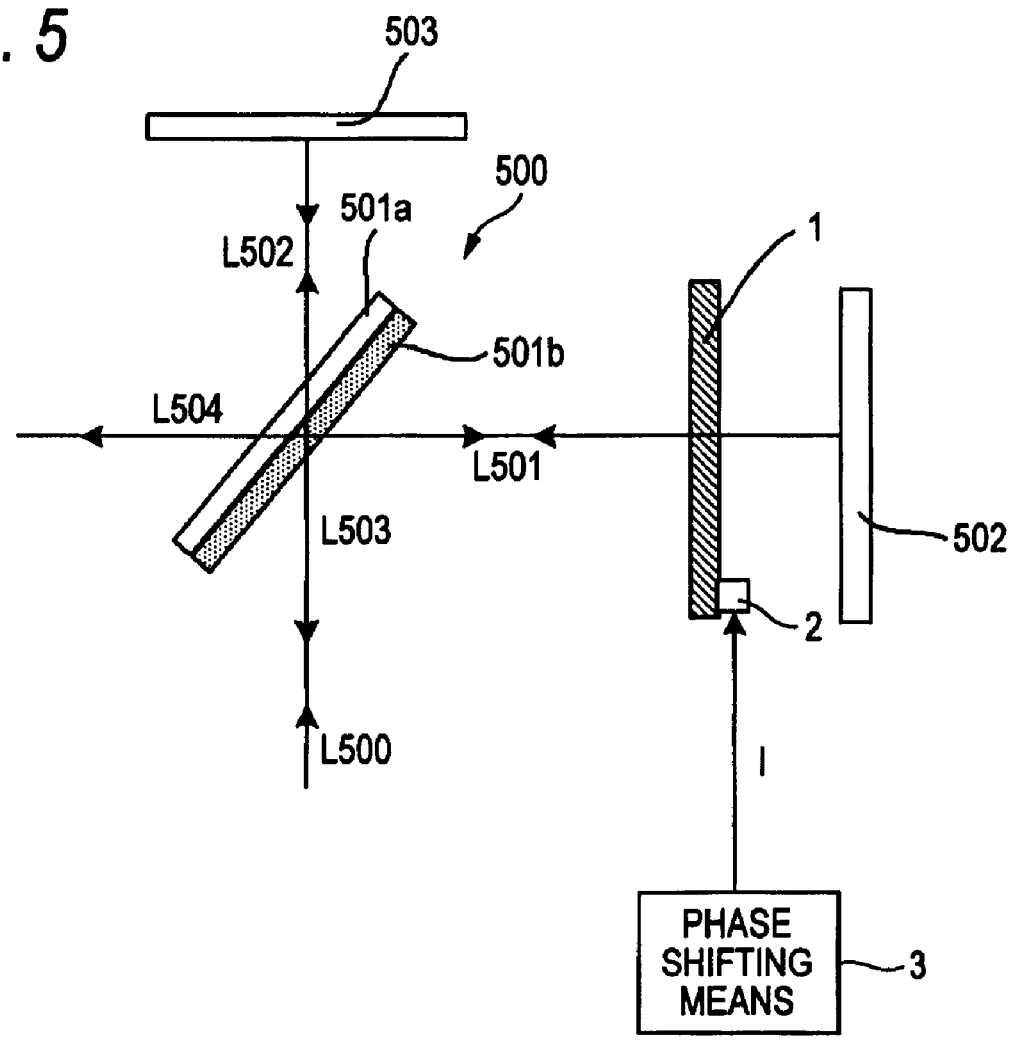
FIG. 5 is a functional block diagram describing the operation of an optical phase shifting plate used for a Michelson interferometer.
Figure 6:
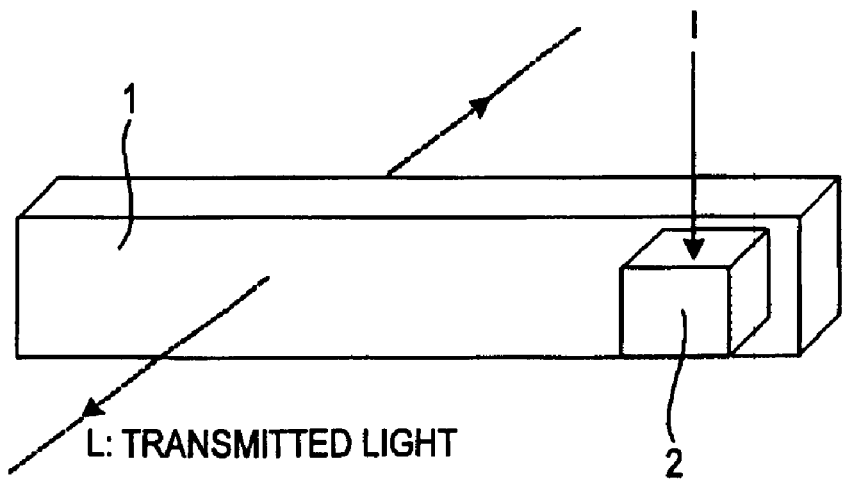
FIG. 6 is a perspective view showing an optical phase shifting plate using a chip heater according to the related art.

FIG. 2 is an enlarged side view showing the configuration of main portions of the optical phase shifting plate according to the exemplary embodiment of the invention. The intermediate member 400 is an alumina-made square member in which first and second surfaces 400a, 400b that are perpendicularly adjacent to each other are gold plated. The first surface 400a is substantially flush with the thin-film heater 200, and they are connected to each other by a first boding wire B1.

Furthermore, the second surface 400b is substantially flush with the wiring member 300, and they are connected to each other by a second bonding wire B2. Similarly with the intermediate member 400, the wiring member 300 is an alumina-made member in which the upper surface 300a is gold plated.

According to the present invention, since the alumina-made square member in which the adjacent surfaces are gold plated is used as the intermediate member 400, the surface of the thin-film heater 200 and the surface of the wiring member 300 that are perpendicular to each other can be three-dimensionally connected to each other by the wire bonding by using a general bonding apparatus that performs the wiring boding process only in the horizontal direction.

According to the present invention, when a Kovar material is used for the package 4, a gold-plated alumina material is used as the wiring member 300 and intermediate member 400. Accordingly, the thermal expansion coefficient of the wiring member 300 and the intermediate member 400 can be matched to that of the package 4.

FIGS. 3A and 3B are plan views showing the configuration of a thin-film heater 200 formed on the optical substrate 100. In FIG. 3A, the thin-film heater 200 is formed to surround a certain region of the surface of the optical substrate 100a that is away from the light incident and outgoing surfaces. In FIG. 3B, the thin-film heater 200 is formed to surround a peripheral edge portion of the surface of the optical substrate 100.

FIG. 4 is a graph describing temperature response characteristics of the exemplary embodiment as compared with the configuration of the related art. The figure shows temperature response characteristics with respect to a step-like change of the heating current. Compared with the related-art chip heater indicated by F2, in the thin-film according to the present invention indicated by F1, it can be understood that the response time is much shortened as indicated by the arrow P, so that phase shift can be achieved at high-speed.

The optical phase shifting plate which has been described in the present embodiment is a shifting plate which can finely adjust the optical path length in a space optical system and also has versatility. The optical phase shifting plate can be effectively used for a Michelson interferometer, a Mach-Zehnder interferometer or the like, which requires a phase shifting means having smaller size and high performance.

According to the present invention, the following effects can be obtained.

(1) Since the thin-film heater is used, the volume of the heater is almost negligible. Therefore, it is possible to realize an optical phase shifting plate that can perform adjustment while consuming a small power.

(2) When the thin-film heater is formed to surround a region other than the optical path, the thermal response time can be shortened as compared with the related art chip heater.

(3) Since the intermediate member is used, the wiring can be performed in a perpendicular direction, and also wire bonding can be used which is usually used in an electronic circuit. Therefore, the reliability of the wiring can be ensured.

(4) The high-speed phase shift can be performed on an interferometer using a space optical system.

(5) In the case where a Kovar material is used in the package, and a gold-plated alumina material is used as the wiring member and intermediate member which are fixed to the package, the coefficient of thermal expansion can be matched to that of the package. Therefore, optical path length variation with respect to temperature variation can be maintained at minimum.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An optical phase shifting plate comprising:
    an optical substrate configured to change a refractive index for light which passes through the optical substrate by means of a thermooptical effect;
    a thin-film heater formed on a surface of the optical substrate;
    a wiring member disposed to be substantially perpendicular to the surface of the optical substrate;
    an intermediate member disposed between the optical substrate and the wiring member, the intermediate member comprising:
        a first surface that is substantially flush with a surface of the thin-film heater; and
        a second surface that is substantially flush with a surface of the wiring member and that is perpendicularly adjacent to the first surface,
    a first bonding wire which electrically connects the surface of the thin-film heater to the first surface of the intermediate member; and
    a second bonding wire which electrically connects the surface of wiring member to the second surface of the intermediate member.

2. The optical phase shifting plate according to claim 1, wherein the first and second surfaces are plated, and the intermediate member is a rectangular parallelepiped.

3. The optical phase shifting plate according to claim 1, wherein an antireflection film is formed on incident and outgoing surfaces of the optical substrate.

4. The optical phase shifting plate according to claim 1, further comprising:
    a package which is made of a Kovar material and to which the wirings member and the intermediate member are fixed.

5. The optical phase shifting plate according to claim 1, wherein the wiring member is made of an alumina material and the surface of the wiring member is gold plated.

6. The optical phase shifting plate according to claim 2, wherein the first and second surfaces are gold plated.

7. The optical phase shifting plate according to claim 1, wherein the thin-film heater is formed to surround a portion of the surface of the optical substrate that is away from light incident and outgoing surfaces of the optical substrate.

8. The optical phase shifting plate according to claim 1, wherein the thin-film heater is formed to surround a peripheral edge portion of the surface of the optical substrate.

9. The optical phase shifting plate according to claim 1, wherein the optical phase shifting plate is used for a Michelson interferometer or a Mach-Zehnder interferometer.

* * * * *